United States Patent [19]
Scandura et al.

[11] Patent Number: 5,262,761
[45] Date of Patent: Nov. 16, 1993

[54] DISPLAYING HIERARCHICAL TREE-LIKE DESIGNS IN WINDOWS

[75] Inventors: Joseph M. Scandura, Narberth; Don C. Stone, Philadelphia, both of Pa.

[73] Assignee: Intelligent Micro Systems, Inc., Narberth, Pa.

[21] Appl. No.: 429,947

[22] Filed: Oct. 30, 1989

Related U.S. Application Data

[63] Continuation-in-part of Ser. No. 94,274, Sep. 8, 1987, abandoned.

[51] Int. Cl.$^5$ .............................................. G09G 5/00
[52] U.S. Cl. ..................................... 340/133; 395/160
[58] Field of Search ............... 340/703, 706, 710, 721, 340/723, 724, 734, 747, 748; 358/183; 364/518, 521; 395/118, 153, 155, 157, 160

[56] References Cited

U.S. PATENT DOCUMENTS

| | | | |
|---|---|---|---|
| 4,464,652 | 8/1984 | Lapson et al. | 340/710 |
| 4,486,745 | 12/1984 | Konno | 340/734 |
| 4,559,533 | 12/1985 | Bass et al. | 340/724 |
| 4,622,545 | 11/1986 | Atkinson | 340/747 |
| 4,710,763 | 12/1987 | Franke et al. | 340/723 |
| 4,736,308 | 4/1988 | Heckel | 364/518 |
| 4,821,211 | 4/1989 | Torres | 340/747 |
| 4,873,623 | 10/1989 | Lane et al. | 340/706 |

OTHER PUBLICATIONS

Scandura, "A Cognitive Approach to Software Development: The PRO DOC Environment and Associated Methodology", Journal of Pascal, Ada, +Modula-Z, vol. 6, No. 5, Sep. 1987, pp. 10-25.

Robson, "Object-Oriented Software Systems", BYTE Publications Inc., Aug. 1981, pp. 74-86.

Tesler, "The Small Talk Environment", Byte Publications Inc., Aug. 1981, pp. 90-147.

Dijkstra, E. W., "Notes on Structured Programming", Academic Press, 1972, pp. 16-23.

Martin, J. and McClure, C., "Action Diagrams", Prentice-Hall, 1985.

*Primary Examiner*—Richard Hjerpe

[57] ABSTRACT

Design tools typically require representation of tree-like structures. These structures may be represented at various levels of refinement (or conversely, of abstraction). Existing methods of displaying different levels of a design involve either outlining methods which lack perceptual unity and/or obscure essential process considerations or the use of different windows (e.g., overlapping rectangular areas) which obscure essential relationships among the levels. FLOWforms TM (Scandura, 1987) have some of the requisite properties but it is not obvious how they map into various programming languages or how they might be constructed automatically in real time. Disclosed herein is a process for displaying arbitrary numbers of different levels of a design which apply equally to data and process and which automatically represent such relationship in proper visual context. This process shows how various configurations of rectangular regions can be constructed and embedded within one another to automatically refine each data or process element (represented by a rectangular region or box-like "window") to display desired information in a limited display area in precisely the proper context without increasing the contextual scale. During expansion, each such region or window is replaced by a larger region containing a structured, distinctive configuration of regions of the original size. Such configurations represent the refinement. Optionally, at the top of the embedding region are the contents of the original region set off by an easily distinguishable border.

7 Claims, 11 Drawing Sheets

| | | |
|---|---|---|
| Get structure type of selected element. | | |
| Draw/insert contents of selected element if contents are to be retained and highlighted. | | |
| CASE type of structure OF | | |
| sequence | Indent and go to or create first child of sequence element. | |
| | REPEAT | Draw/insert FLOWform structure for current child of sequence element. Advance to or create next child if appropriate. |
| | UNTIL child is non-empty | |
| selection | Go to or create condition child and insert keyword (e.g., "IF") and then contents of condition child. | |
| | Go to or create second child, insert keyword (e.g., "THEN"), then draw/insert FLOWform structure for that child. | |
| | Go to or create third child, insert keyword (e.g., "ELSE"), then draw/insert FLOWform structure for that child. | |
| case | Go to or create selector child of case element. Advance to or create next child (first alternative) of case element. | |
| | REPEAT | Draw/insert FLOWform structure for current child of case element. Advance to or create next child if appropriate. |
| | UNTIL child is non-empty | |
| while | Go to or create condition child of while element and insert keyword (e.g., "WHILE") and then contents of condition element. | |
| | Go to or create loop body child and insert keyword (e.g., "DO") and then draw/insert FLOWform structure for that child. | |
| until | Go to or create loop body child and insert keyword (e.g., "REPEAT") and then draw/insert FLOWform structure for that child. | |
| | Go to or create condition child and insert keyword (e.g., "UNTIL") and then contents of condition element. | |
| terminal | Insert contents of element into display memory, as described in detailed description of invention. | |

Fig. 10

DISPLAYING HIERARCHICAL TREE-LIKE DESIGNS IN WINDOWS

This application is a continuation-in-part of patent application Ser. No. 07/094,274, filed Sep. 8, 1987, now abandoned.

FIELD OF THE INVENTION

This invention relates to the process of creating embedded regions or display windows on a computer video screen while specifying, designing, implementing and maintaining hierarchical tree-like system designs. The process provides for displaying on a computer screen arbitrary numbers of different levels of data or a design process in such a way that relationships among the embedded regions, or levels of abstraction, are represented in context graphically in terms of box-like straight line segments.

BACKGROUND OF THE INVENTION

Existing methods of displaying tree-like structures on a video screen fall in one of two general categories. The first method involves the use of successively detailed outlines. At the top level, for example, a display might consist of a list of three similarly indented items. The first, then, might be further refined into subitems. These subitems might be indented, for example, or differently colored. These, in turn, could be further refined.

In general, standard outlining methods of this sort have been used in "idea processors," like Think-Tank TM from Living Videotext. They also have been used in slightly modified form to display hierarchical structures in computer source code. Brackets, for example, are used to set off successive structures (refinements) in "Action Diagrams" (e.g., Martin & McClure, 1985). These outlining methods help to focus human perception. This latter quality is extremely important since it provides at a glance crucial structural information that would otherwise have to be inferred from detailed study.

The techniques used, however, are inherently data-based. Systems designs and source code, on the other hand, invariably involve processes as well as data structures. As Dijkstra (1972) has shown, there are three major types of process decomposition: sequence, selection and iteration or loop, plus their variations. Current outlining methods do not provide a visual or graphical distinction between different types of structural decompositions.

Figure 1:
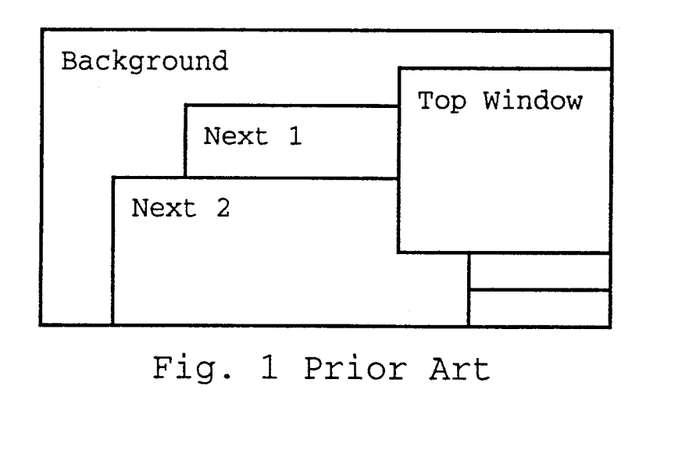
FIG. 1 shows a typical arrangement of overlapping display windows on a video screen. For example, the "background" window might refer to the top level description of a system design, "next 1" to a refinement (expansion) of one component in "background", "next 2" to a refinement of one component in "next 1", and so on. In standard windowing systems, the windows may and usually are placed in a haphazard manner. Windows which expand on elements in other windows cannot normally be positioned in context, that is within the to-be-expanded element.

The second general method involves the use of windows on computer screens and has a relatively recent history. Initially, windows were used to superimpose new information (e.g., a submenu of choices) on an existing background screen. This idea has been extended more systematically in what are commonly called "smalltalk" or "object-oriented" systems. A typical object-oriented interface uses a series of overlapping windows, with the 'top' fully visible window constituting the current workfile (see D. Robson, 1981, and L. Tesler, 1981). The underlying metaphor is that of a table top. A sample configuration of overlapping windows is shown in FIG. 1.

Overlapping windows also are widely used in Computer Aided Systems (CAS) software and in terms of its more specific variants: Computer Aided Design (CAD), Computer Aided Manufacturing (CAM), Computer Aided Engineering (CAE) and Computer Aided Software Engineering (CASE) systems. Such windows are equally useful in representing both hierarchical data structures and procedures.

Figure 2:
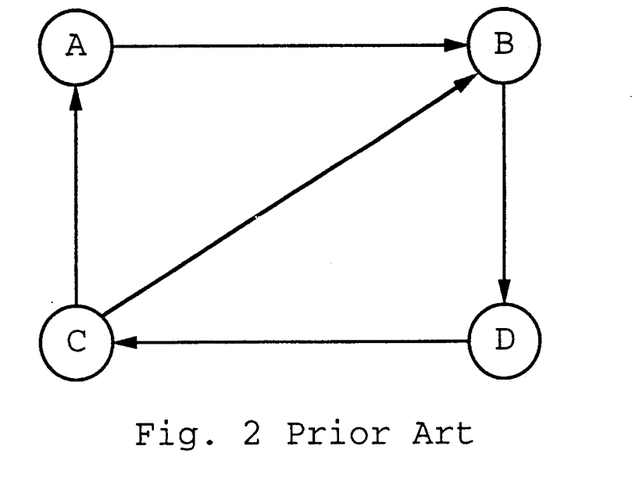
FIG. 2 shows four elements at any one level of a design, together with connecting lines depicting relationship (e.g., data flows) between them.

The representation of relationships among various entities plays an important role in each of these areas. Typically, entities are represented by simple objects (boxes, circles, etc, which are often labeled), and by directed lines connecting these entities. FIG. 2 is illustrative. Franke et al have developed a method for generating and displaying limited portions of tree structures in a limited display area (see U.S. Pat. No. 4,710,763). This method is concerned with displaying trees at some predetermined level of refinement (together with the associated parent and successor nodes). The overall higher level structure, however, is still displayed in a separate window.

In computer aided systems design, it is often essential to refine individual elements in a display, tree-like or otherwise (e.g., FIG. 2). Such refinement involves expansion of one (or more) of the elements to show the elements and relationships of which it is composed. This is normally done in a separate window. Components in an expansion may be expanded in turn. In principle, the process may be repeated indefinitely.

Existing processes for positioning windows involve overlapping rectangular windows (e.g., as shown above in FIG. 1). Typically, windows also can be moved arbitrarily on the screen either by use of a "mouse" or from the keyboard (see U.S. Pat. No. 4,464,652).

Apple Computer, Inc. has since refined the process further for use on its Macintosh computers by using techniques which permit the representation and manipulation of any arbitrarily defined regions in terms of inversion points (see U.S. Pat. No. 4,622,545). These techniques are potentially useful in dealing with arbitrary shapes in bit mapped systems.

These methods of windowing have important limitations, however, when it comes to representing different levels of refinement in displaying hierarchical tree-like designs. First, since they typically require computer generated graphics, they are relatively slow and/or require high powered computer workstations to achieve acceptable levels of performance in environments where windows representing complex tree-like designs need to be changed frequently and/or quickly. The high memory and processing requirements of graphics based windowing systems also tend to restrict the number of levels of refinement.

Given the relatively rapid rate at which computer technology is advancing, these limitations may be considered temporary. Nonetheless, decrements in display times and the incremental costs for such hardware (over text based systems) are likely to remain for the foreseeable future. In short, a system based on the display of text characters would have advantages with regard to speed, and the size of computers on which windowing systems might be implemented. Display speed, for example, inherently depends on the sheer amount of video memory which must be updated for screen display, even though modern microcomputer hardware typically supports "direct writes" to screen memory. And, the amount of memory which must be updated in the case of bit mapped (graphic-based) system is greater than in character-based systems.

An even more serious (permanent) limitation of current representational and windowing processes is that it is not feasible to arrange windows so as to show relationships between different levels of refinement. That is, one can see relationships at any one level for those portions of a design that fit on the screen (e.g., see reference above to Franke et al). However, relationships at different levels of a refinement are spatially separate. Except in very special cases, it is effectively impossible to place expansions of a given entity on the screen in the same context in which the original entity appeared.

Suppose, for example, that one element (i.e., bubble) in the 'window' of FIG. 2 is expanded to the next level of detail (e.g., a more refined data flow diagram). One way to display this expansion would be to decrease the size (increase the scale) of the expanded window so it would fit (essentially) inside the original bubble (element); in this case, unfortunately, the expansions become too small to see. The alternative is to increase the scale of the original window so the expression fits, but this results in less of the overall design being visible in the limited screen area. Consequently, expansions of elements in one window are typically displayed in a separate window.

To help compensate, existing methods use such techniques as darkening or otherwise marking entities which have been expanded. These techniques, however, do not help the eye perceive expanded details directly in the higher level contexts to which they logically belong. Experience (as well as cognitive research) shows that it is difficult to work effectively with more than three or four levels of refinement. It becomes increasingly difficult to know how the various levels of refinement are interrelated.

FLOWforms (Scandura, 1987) have some of the desired properties but it is not obvious how they map into various programming languages or how they might be constructed automatically in real time. The current invention uses FLOWforms to retain the contextual advantages of displaying windows using outlining methods along with the visual and procedural (process) capabilities of overlapping windows. In brief, this is accomplished by showing how various configurations of rectangular regions can be constructed and embedded within one another. Different levels of both data and process oriented designs are enclosed in simple box-like displays. In this context, it is important to recognize that items enclosed in simple shapes, such as rectangular boxes, help human perception as much as (and typically more than) using a variety of complex graphical shapes.

Figure 3A:
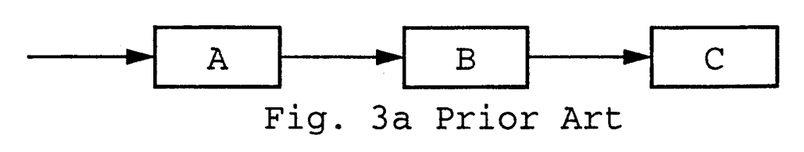
FIG. 3a-c show standard flow chart representations, respectively, for a sequence of steps, a decision or selection structure and a loop or iteration.
Figure 3B:
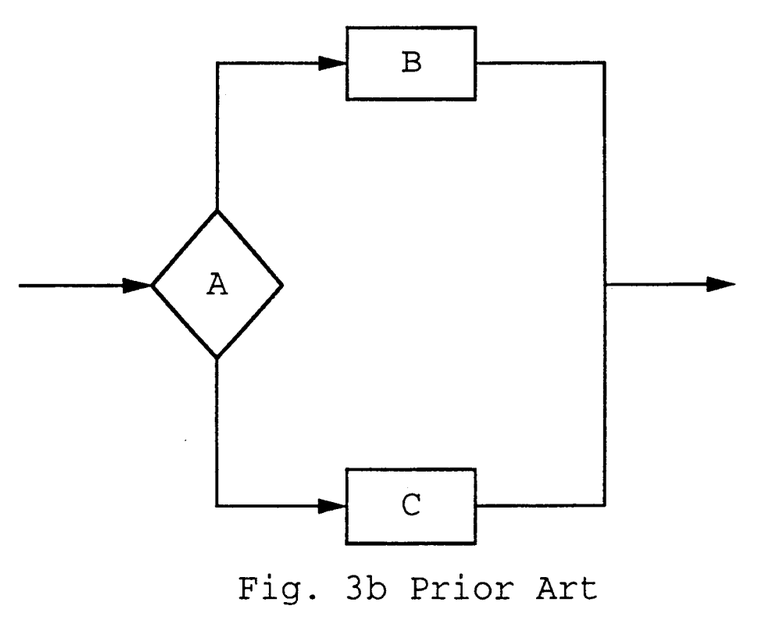
Figure 3C:
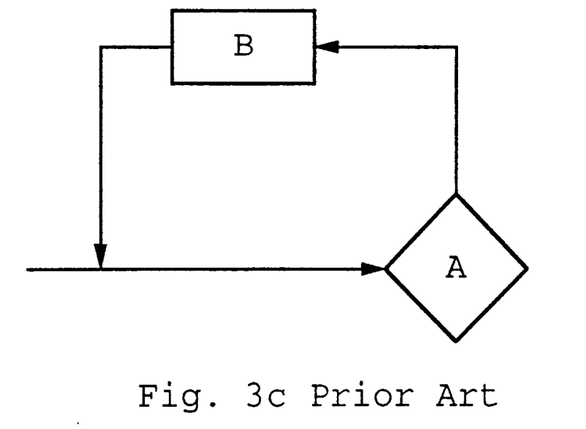
Figure 4A:
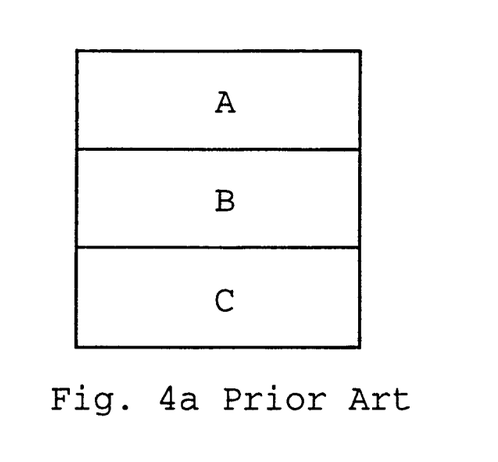
FIG. 4a-c show Nassi-Shneiderman flow chart representations corresponding to the standard flow chart representations in FIG. 3a-c.
Figure 4B:
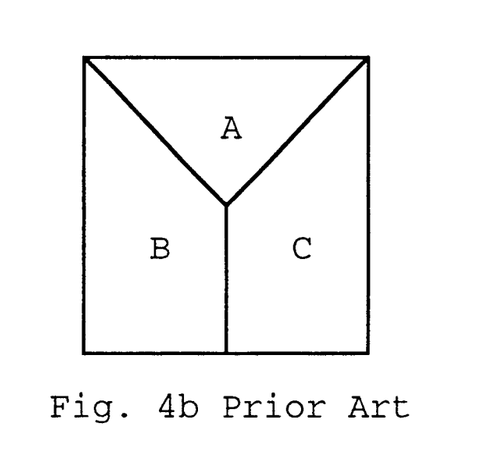
Figure 4C:
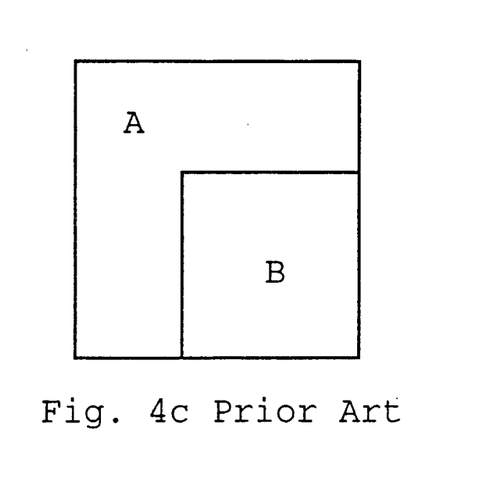
Figure 5A:
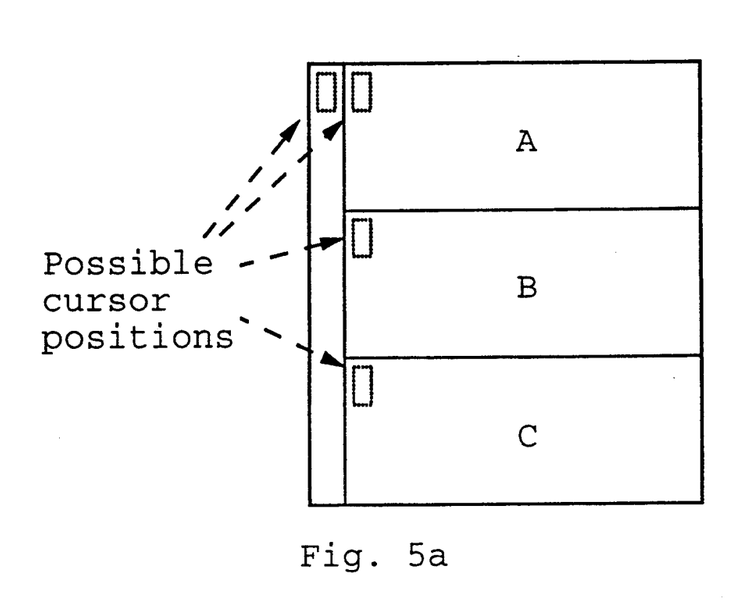
FIG. 5a-b show two representations of a sequence, FIG. 5a with the three elements A, B and C as children of the sequence structure <a, b, c> and FIG. 5b with the sequence <a, b> and c as children. Possible cursor positions are shown as small dashed boxes. When editing an individual rectangular region, the standard operating system cursor is positioned at the current character position within the surrounding rectangular area representing the element itself.
Figure 5B:
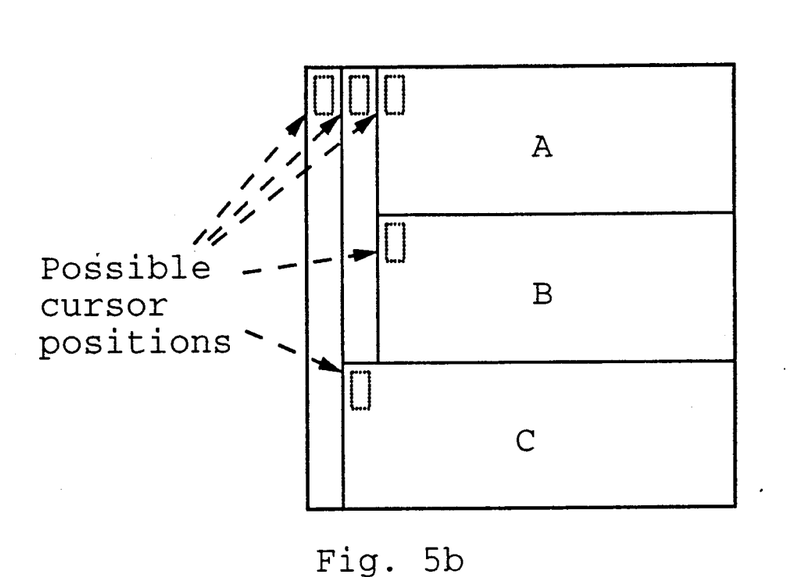

There are, of course, various means of representation which are based on straight lines (rather than arbitrary graphics). We mention the Nassi-Shneiderman representation since it is related to the FLOWform TM representation used in this invention. Unlike the use of arrows, as shown in FIG. 3a, b and c as in standard flowcharts, the corresponding Nassi-Shneiderman representations would look like FIG. 4a, b and c. One minor problem with the Nassi-Shneiderman format is the lack of any means of distinguishing different levels of a sequence refinement. By way of contrast FIG. 5a shows an alternative representation used in this invention in which A, B and C are all seen to be part of the same refinement of the sequence containing them, whereas FIG. 5b shows that A and B form one sequence which together with C form a higher level sequence.

A still more serious problem is that the Nassi-Shneiderman representation of a selection (FIG. 4b) splits the available screen horizontally. Consequently, refinement of B or C (in FIG. 4b) would split the screen still further. Very rapidly, one runs out of space for display purposes. A third limitation is equally critical in so far as the proposed process invention is concerned. The Nassi-Shneiderman format says nothing about the representation of relationships between different levels of refinement. This format is subject to the same limitations described above in so far as windowing is concerned.

A final consideration is that the Nassi-Shneiderman representation does not explicitly provide for data structures. Indeed, there is no uniform and universally accepted method for representing both data and process graphically.

A number of patents deal with similar issues but have only superficial relevance. Lane et al (see U.S. Pat. No. 4,873,623) describe an invention pertaining to three level dynamic menus which have nothing to do with displaying the structure of systems involving data structures and processes. Although Franke et al (see U.S. Pat. No. 4,710,763) are concerned with displaying system structure in a limited area, the method of display, the type of representation and their restriction to representing three levels of a tree are very different. Atkinson's invention (see U.S. Pat. No. 4,622,545) deals with the compression and manipulation of images. We do not use compression and we manipulate characters rather than bit maps per se. Konno (see U.S. Pat. No. 4,486,745) deals with the general issue of creating patterns from a smaller number of symbols. The current invention uses a very restricted set of symbols, line segments, to produce simple rectangular patterns in a very efficient manner. Bass et al (see U.S. Pat. No. 4,559,533) deals with moving images on a CRT screen by assigning image priorities. Our invention uses well known technologies to move portions of screen memory. Lapson et al (see U.S. Pat. No. 4,464,652) refers to a mouse controller for a screen cursor. Our invention has nothing to do with mouse controllers. How the cursor is actually moved is irrelevant. Torres (see U.S. Pat. No. 4,821,211) deals with menu hierarchies, ours with system structures. Heckel (see U.S. Pat. No. 4,763,308) is concerned with displaying selected portions of two or more records from different files on a display screen. Our invention is concerned with displaying arbitrary combinations of levels of tree-like structures, always from a single file.

SUMMARY OF THE INVENTION

The display process disclosed herein is specially designed to represent hierarchical system designs at arbitrary levels of refinement and to quickly position embedded rectangular regions representing successive refinements of the corresponding procedures and/or data structures in windows on a computer video screen always in the proper context without changing the contextual scale.

The process combines the advantages of outlining and of overlapping windows, and provides a uniform visual means for representing arbitrary procedures and arbitrary data structures at arbitrary levels of refinement. Toward this end, FLOWforms (Scandura, 1987) have some of the desired properties but it is not obvious how they map into various programming languages or how they might be constructed automatically in real time.

Components (elements) in a tree-like structure are represented as rectangular regions which may be expanded as easily distinguishable configurations of embedded rectangular regions directly in their current context. A rectangular region may be refined in either of two modes: (a) replace the higher level element (region) with its refinement or (b) retain and highlight (e.g., by adding a distinctive border to) the higher level element with the refinement immediately below.

Rectangular regions used to represent procedures may be refined in one of three basic ways: Elements can be expanded as a sequence of elements, as a selection in which the first (top) element is a condition (often but not necessarily preceded with the word "IF") which determines which of the following elements is to be executed or as an iteration or loop in which one element is the loop condition and the other is the body of the loop. The choice of key descriptive words (e.g., IF . . . THEN, REPEAT, etc.) depends on the programming or design language one wishes to model as a tree-like structure.

Data structures (things to be operated on) are represented in a manner which directly parallels that used with generalized selection (CASE) refinements but without replacement. Notice that this is directly analogous to standard outlining. All refinements take place in the same way.

The refinement process itself is accomplished by retaining in memory all of the display characters above, below and to the left of the element to be refined. The display characters above the refined elements are retained on the screen while the user specified refinement is drawn below.

The same drawing process used in refinement is also used to rapidly and dynamically restructure (e.g., delete, move or insert) substructures in the rectangular regions.

BRIEF DESCRIPTION OF THE DRAWINGS

FIG. 6a-b show two pairs of representations depicting alternative refinements of a sequence.

FIG. 10 summarizes the essential process described in DETAILED DESCRIPTION OF THE INVENTION of drawing or inserting a structure on screen memory.

DETAILED DESCRIPTION OF THE INVENTION

The display process disclosed herein is specially designed to represent hierarchical system designs at arbitrary levels of refinement and to quickly position windows within windows representing successive refinements of the corresponding procedures and/or data structures on a computer (video) screen always in the proper context without changing the contextual scale.

The process combines the advantages of outlining and of overlapping graphical windows, and provides a means for representing arbitrary procedures (structured using the sequence, selection and iteration constructs shown in FIG. 3a-c, FIG. 4a-c and described more fully by Dijkstra, 1972), as well as arbitrary data structures, at arbitrary levels of refinement. Toward this end, FLOWforms (Scandura, 1987) have some of the desired properties but it is not obvious how they map into various programming languages or how they might be constructed automatically in real time.

In general, embedded regions are visual representations of simple underlying tree-like structures: Ordered sets of elements which themselves may be ordered sets. The basic structure is what is called a partial ordering in mathematics. A partial ordering is a "tree" in which an element may have two or more parents. Such an element is called a "clone" and would be represented as a common region embedded within each of its associated parents. Elements (rectangular regions) corresponding to the structures or ordered sets in a tree-like structure are selected by moving an easily distinguishable square cursor to the upper left corner of the corresponding window. Elements corresponding to selection or loop conditions (see below) appear one space after a design or programming language specific selection or condition keyword (e.g., IF, UNTIL).

Figure 6A:
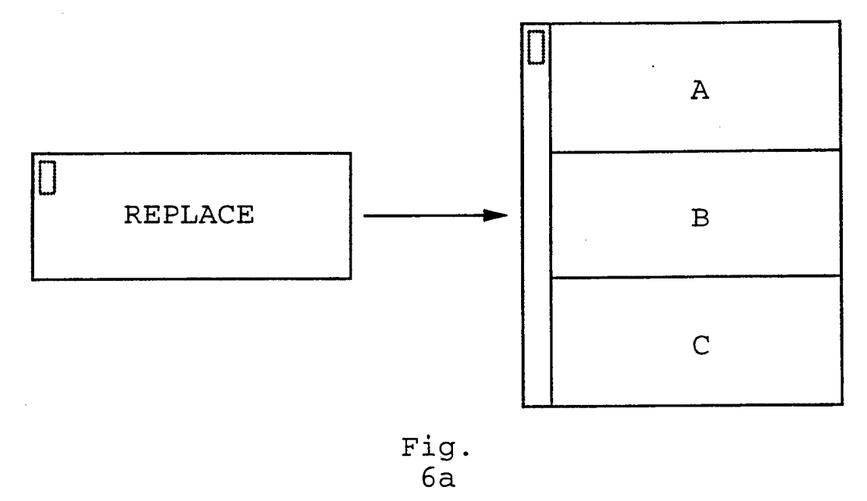
FIG. 6a shows a representation of a sequence structure (element) before and after refinement in which the refinement replaces the higher level (i.e., the structure itself).
Figure 6B:
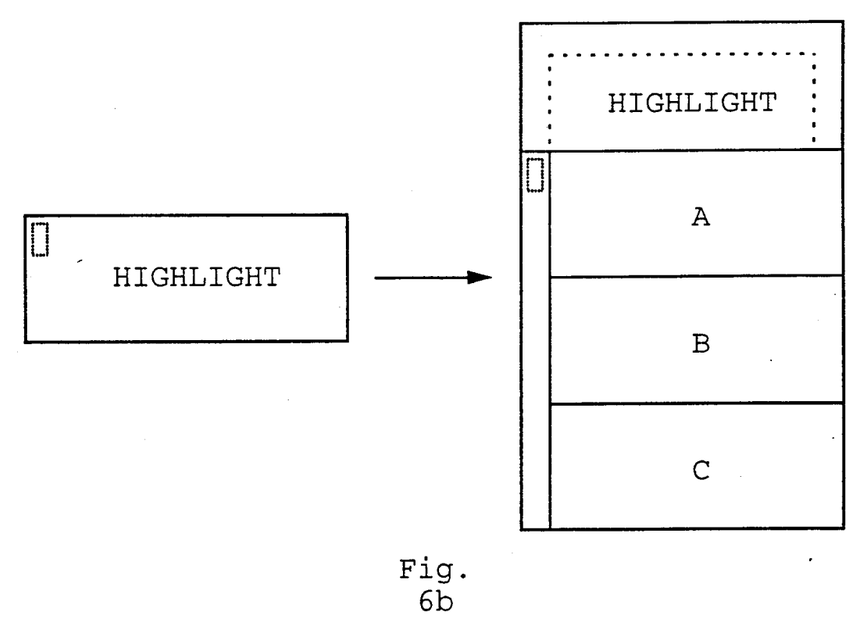
FIG. 6b shows a representation of a sequence structure before and after refinement in which the refinement extends below the higher level structure (i.e., the original element) which is highlighted (e.g., colored differently or displayed within a distinctive border). Cursor is shown in corresponding positions in FIG. 6a, 6b and 6c.

Any selected region may be refined in either of two modes: (a) replace the higher level region with its refinement (FIG. 6a) or (b) retain and highlight (e.g., by using a different color or adding a distinctive border) the contents of the higher level region with the refinement immediately below as in FIG. 6b.

In the process described herein, rectangular regions are expanded, or refined, directly in their current context. Effectively, the rectangular regions are "windows". NOTE: Expansions in the following examples use replacement and highlight modes interchangeably. In the PRODOC TM implementation of this invention, both types of refinement or expansion are available at the touch of key.

Figure 7A:
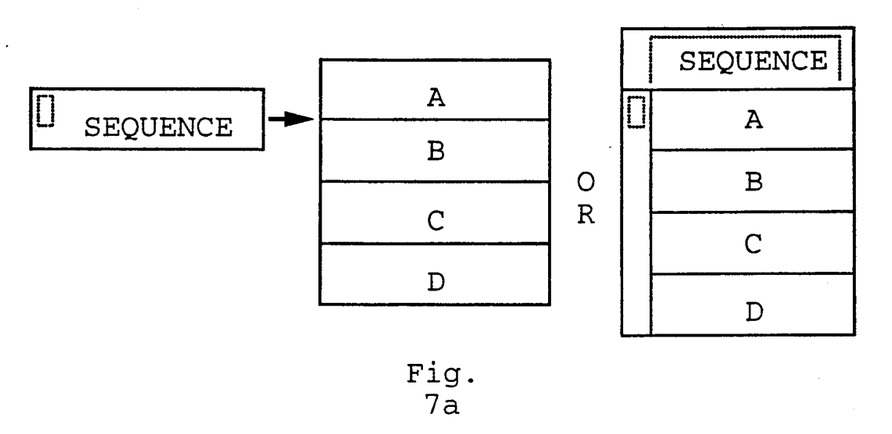
FIG. 7a-g show basic ways in which rectangular regions may be refined into sequences, selections and/or iterations. The examples include expansion with and without sequence indentation, with replacement and with retention and highlighting of original (higher level) elements. Notice in each case that the refinement appears in the proper context and that the overall contextual scale remains unchanged. Cursor is shown in corresponding positions in FIG. 7a, 7b, 7c, 7d, 7e, 7f and 7g.
Figure 7B:
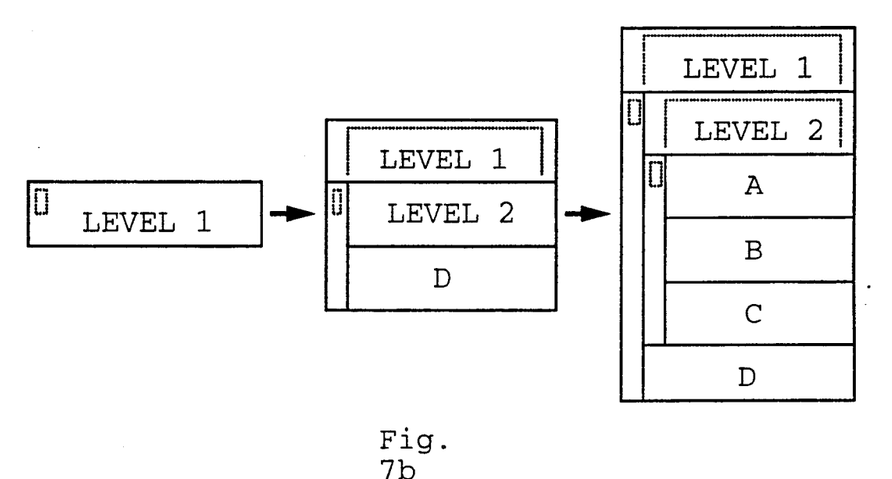

Rectangular regions used to represent procedures (hereafter procedure elements) are refined in one of three basic ways corresponding to the three basic constructs in structured programming:

(1) Procedure elements can be expanded as a sequence of elements as shown in FIG. 7a. The difference in the alternative expansions, depends on the user's preference although as noted above (e.g., FIG. 4a, 5a–b), the latter refinement is preferable in that multiple levels of sequence refinement may be distinguished. As shown in FIG. 7b, for example, the "level 1" element has been refined first into a sequence of two elements; "level 2" and "D". Then, the "level 2" element has been further refined into three elements: "A", "B" and "C".

Figure 7C:
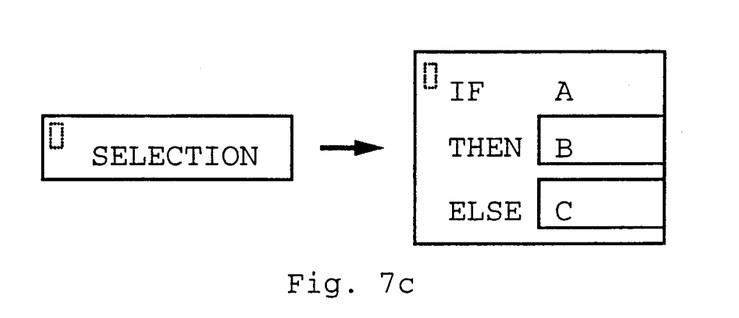
Figure 7D:
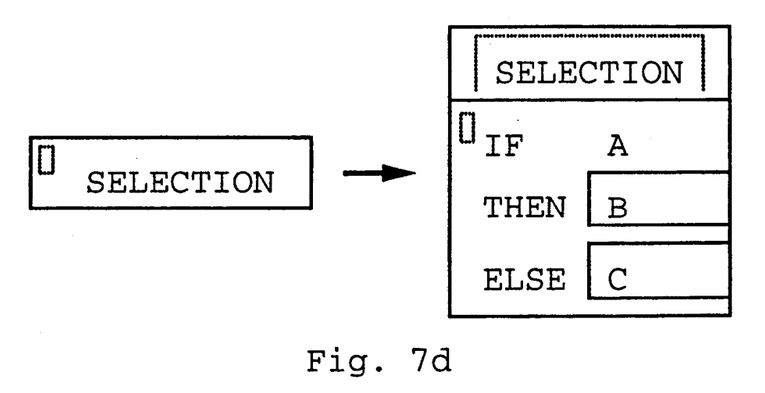
Figure 7E:
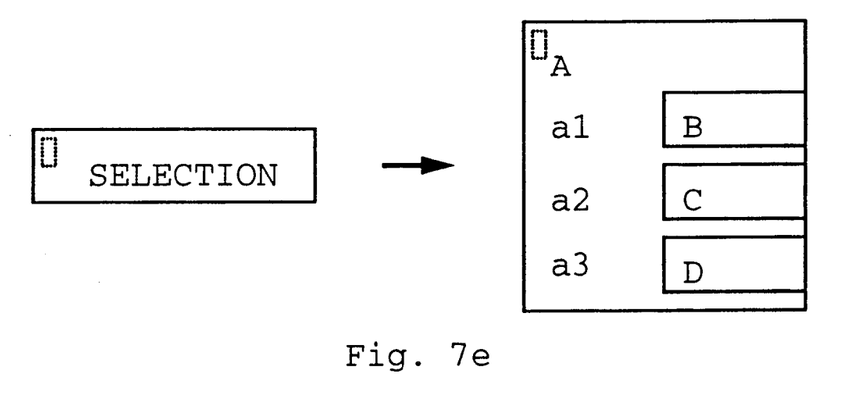

(2) Procedure elements can be expanded into selections in which the first (top) element is a condition (often but not necessarily preceded with the word "IF") which determines which of the following elements is to be executed. FIG. 7c shows a selection refinement of the replaced element named "selection" (using replacement mode). FIG. 7d shows the same refinement in "retain and highlight" mode. Procedure elements also may be refined into a generalized form of selection (e.g., a CASE structure) in which there may be any finite number of selected elements. FIG. 7e shows such a refinement in replacement mode.

Figure 7F:
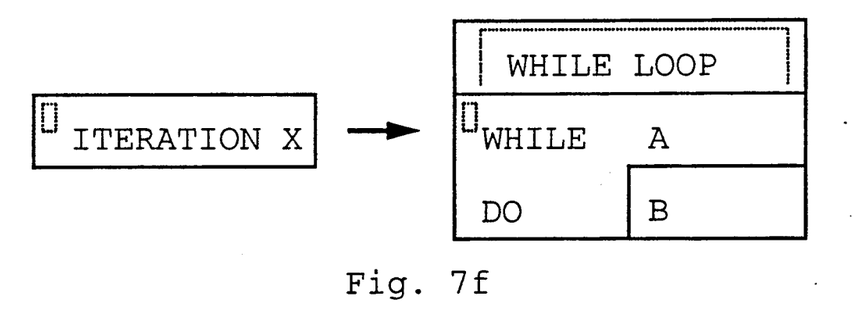
Figure 7G:
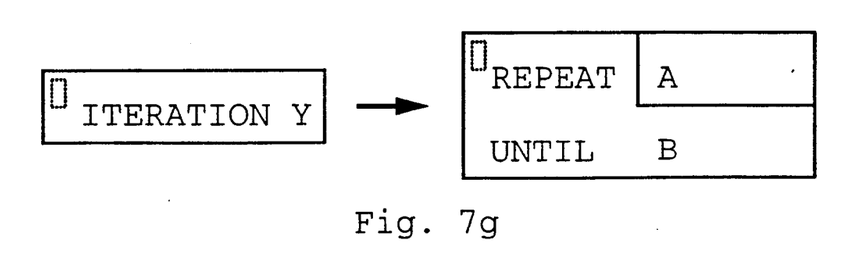

(3) Procedure elements can be expanded as iterations or loops in which one element is the loop condition and the other is the body of the loop. FIG. 7f shows the results of refining the element "Iteration x" into what is commonly called a "while" loop in "retain and highlight" mode, where A is the condition and B the body. FIG. 7g shows the results of refinement of "iteration y" into a REPEAT . . . UNTIL loop in replacement mode.

Figure 8:
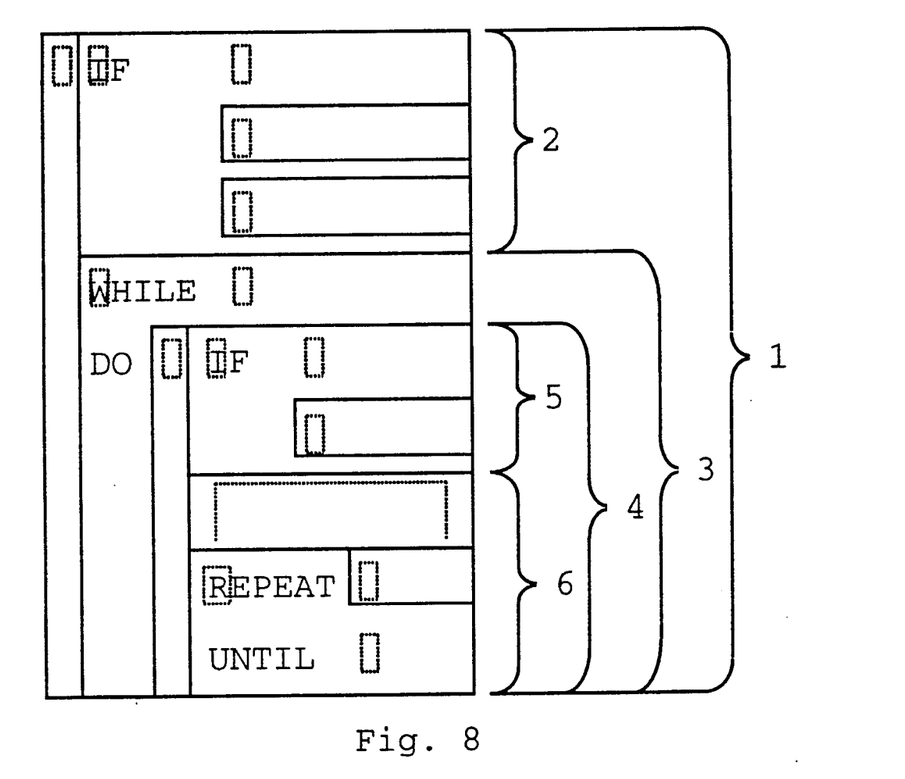
FIG. 8 shows a configuration of embedded regions depicting the results of successive levels of refinement. Each type of refinement: sequence, selection or iteration, is depicted in a distinctive display frame, some with replacement and some with retention and highlighting (of higher level elements). At each stage, expansions appear in context without changing the overall scale. Cursor may appear in any of the positions shown.

The results of several successive refinements of a procedure element is shown in FIG. 8. Here, (1) refers to a sequence replacement into elements (2) and (3). Then, element (2) is subjected to a selection replacement refinement. Similarly, element (3) has been refined with replacement into a WHILE loop, followed by replacement refinement of the body (4) into a sequence consisting of elements (5) and (6). Finally, element (5) is refined into a replacement selection with only one choice, and element (6) into a REPEAT loop with retention and highlighting of the original element (6). At each stage, notice that expansions appear indented from the left according to level of refinement in context without changing the overall scale.

Figure 9:
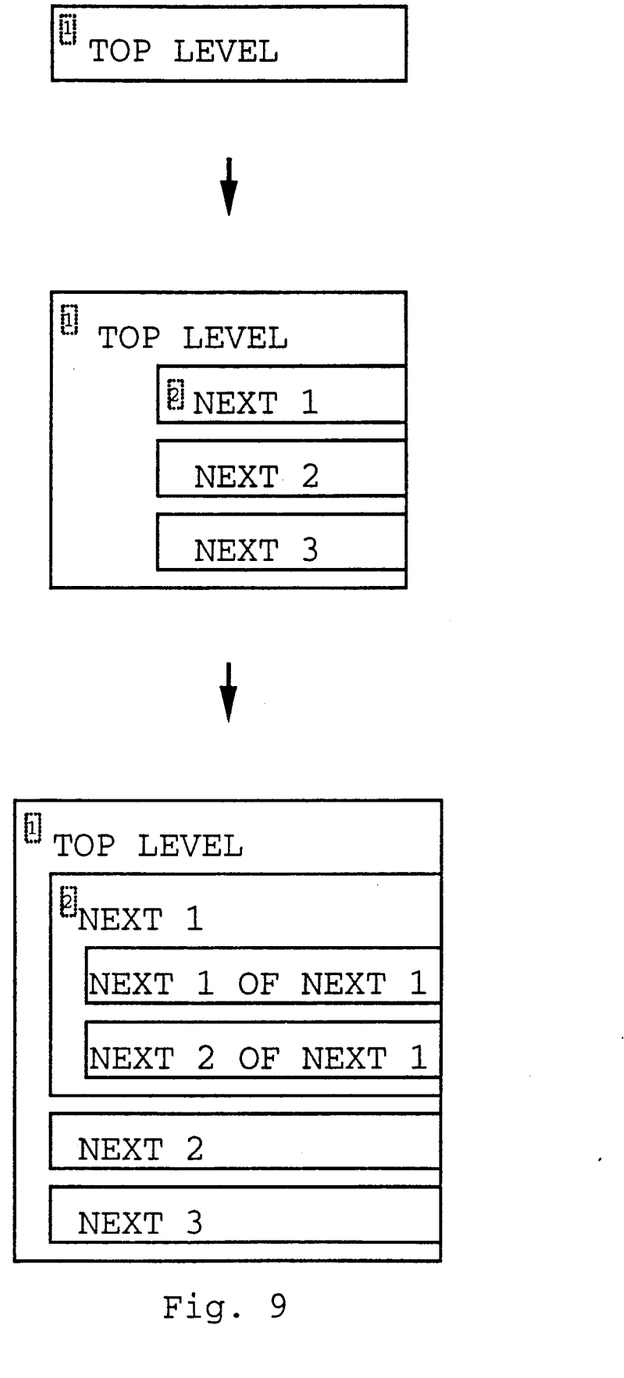
FIG. 9 shows two levels of refinement of a data structure represented as embedded regions. Again, the refinement appears in proper context. The first pair of cursors, with embedded numeral "1", show corresponding positions in the first two figures. The second pair of cursors, with embedded numeral "2", show corresponding positions in the last two figures.

Data structures (things to be operated on) are represented in a manner which parallels that used with generalized selection (CASE) refinements but without replacement (see FIG. 7e). All refinements take place in the same way. FIG. 9 shows the process of successive refinement of a rectangular region (corresponding to a data element). It is worth noting that data refinements are directly analogous to standard "outlining." The major differences are: (a) elements and substructures in data FLOWforms are visually contained in "boxes" which make their structure apparent to the perceiver and (b) alternative but otherwise similar boxlike structures can be used to graphically represent procedures well (as data).

The refinement and/or restructuring process itself is accomplished by retaining in memory all of the display characters above, below and to the left of the element to be refined. Specifically included are lines used to enclose the boxes. The display characters above the refined elements are retained on the screen (in screen memory) while the user specified refinement (e.g., sequence or selection) is drawn below line by line. The top line of the refinement is constructed by combining graphic segments (see next paragraph) where needed. Connecting lines to the left of the refinement are created in parallel with the refinement itself by extrapolating vertical lines representing levels of refinement from the characters used to form the top line of the window or element. The final line of the refinement is determined by taking into account the top line of the FLOWform TM and display characters immediately below the refinement. That is, the bottom line of the original box is overlaid by graphic segments needed (if any) in the refinement. As noted above under BACKGROUND OF THE INVENTION, block moves to screen memory [either partial or complete] may but need not be used to reduce display time. Bass et al have proposed a method of electronically moving portions of several different images on a screen [U.S. Pat. No. 4,559,533] but the present invention relies entirely on well known techniques and makes no use of such methods.

The following graphic symbols (e.g., IBM graphic characters) may be used to construct boxes with easily distinguished edges: ⌊, │, ─│, ─│, ⌊─, ─│, ╷──, ─╷,⌊─. These segments can all be viewed as constructed via software from various binary combinations of the four components or rays of "+". Each of the four components is used, or not used, in constructing any given graphic segment. For example, "╷─" is composed of the right and bottom graphic segments. This makes it easy and computationally efficient to retain FLOWform TM graphic segments in memory, to "overlay" segments and to compare them in computing line extensions to the left of a refined element. NOTE: Konno has recently proposed a hardware apparatus capable of generating patterns by controlling (e.g., rotating) a smaller number of basic patterns [U.S. Pat. No. 4,486,745]. The current method, by way of contrast, involves constructing 10 [of a possible 16 ($2^4$)] graphic symbols needed to construct intersecting rectangular shapes from four binary graphic segments, in situations where software control and display speed are primary considerations.

The same contextual drawing (e.g., refinement or expansion) process is used repeatedly in the process of restructuring (e.g., deleting, moving, duplicating, cloning or inserting substructures/portions of) embedded rectangular regions. When a substructure is moved, for example, graphic segments in the line immediately below the moved substructure (and following material) cover or overwrite the top line of the moved substructure making the substructure disappear. The graphic segments composing the lines immediately above and below the moved substructure are superimposed on one another. Spurious segments are eliminated in the process. During insertion, the moved substructure is drawn beginning from the point (line) of insertion as in refinement (see above).

In addition, arbitrary levels of refinement (subject only to memory constraints) are made possible by automatically moving to a new display screen (while retaining the original screen in memory) when the amount of space to the right of the left most edge of a to-be refined window or element is not sufficient to display sufficient descriptive information (e.g., if less than 20 characters per line are available). Independently, the user may also specify directly whether refinement is to take place on the same screen or on a separate screen. Moving to a new screen (i.e., to the right of existing screens as described above) is accomplished using standard stack techniques by retaining previous screens sequentially in memory. When creating or removing a new screen, the screen memory must be updated (e.g., to contain a window pertaining to a more refined or detailed portion of the underlying partial ordering). In effect, each screen can be thought of as a window on a hierarchical portion of the underlying partial ordering.

The rectangular regions are drawn on the screen initially by a recursive procedure which includes a case structure with alternatives for each of the allowed constructs (e.g., sequence, selection, iteration). Graphic symbols used to construct the regions' line borders (together with the text) are put into a queue which contains graphic symbols defining the previous line and the current line. Information from the current line is used to update graphic symbols in the previous line before that line leaves the queue and is drawn on the screen. For example, a "--" on the previous line would be changed to "-¡-" if the corresponding graphic symbol on the current line was " ¦ ". The above process of drawing or inserting a structure in screen memory is summarized in FIG. 10.

What is claimed is:

1. A method for displaying tree-like data and process structures in multiple and embedded display regions within separate windows on a display.

where arbitrary portions of each tree-like data and process structure are displayed in separate and distinct, but possibly overlapping areas or windows on the screen, and where each embedded region corresponds to the root element of a unique subtree, also known as a substructure, of one tree-like structure, and where each embedded region corresponds to one of: (a) a data structure and (b) a process structure, and where more than one region may correspond to the same element in said tree-like structure wherein said element is called a clone, and where each inner region embedded in an outer region corresponds to a descendent element in said tree-like structure of the ancestor element corresponding to the outer region, and where each region has a name, type, structure, label, value and other fields embedded in it which are attributes of, or provide information about the corresponding root element of said tree-like structure, and where the viewer may choose to display any portion of any subtree of any tree-like data and process structure in embedded regions of a window, and where the viewer may select any element of said tree-like structure by moving a cursor to the corresponding region, and where the configuration of regions immediately within the region depends on the type of data or process structure assigned to the root element corresponding to said region, and where for any terminal element the viewer may choose to add new child elements of such terminal element by selecting a configuration of regions to be displayed immediately within the region corresponding to such terminal element in said tree-like structure, and where the viewer may choose to modify the contents and display characteristics of any element of said tree-like structure corresponding to the region containing such cursor, and where the viewer may select to modify the structure of said tree-like structure and where the viewer may select to modify the portion of said tree-like structure to be displayed, said method comprising the steps of:
a) selecting a window on the screen in which to display said tree-like structure and a tree-like structure to be displayed in said window, and a design or programming language and module type (or function, package, etc.) associated with said language, where said language and module type collectively determine key words to be displayed in said regions,
b) selecting the root and an initial portion of a subtree of said tree-like structure of step a) to display,
c) displaying the root of said subtree of step b) in a rectangular region on the screen,
d) displaying said selected initial portion of step b) in embedded regions within the rectangular region of step c),
e) selecting to move a cursor to any displayed region of said tree-like structure of step a),
f) when a region contains said cursor of step e), selecting one of five options:
(1) moving said cursor to another region,
(2) modifying the contents of said region, .
(3) deleting said region and the regions contained within said region, and the subtree whose root corresponds to said region,
(4) modifying the configuration of regions contained within said region,
(5) modifying the configuration of regions outside of said region,
g) when said region of step e) corresponds to a terminal element in said tree-like structure of step a), selecting one of:
(1) the five options of step f), and
(2) refining or expanding such region, by selecting the configuration of regions to be displayed immediately within such region,
h) when said region of step e) is an innermost region on the screen and corresponds to a non-terminal element in said tree-like structure of step a), selecting one of:
(1) the five options of step f),
(2) displaying a selected configuration of regions below said region, and (3) displaying a selected configuration of regions on a separate screen, i) when said region of step g) corresponds to the root of a process structure, and the viewer selects to refine said region, selecting one of:
   (1) a sequence structure,
   (2) a selection, including all IF . . . THEN, and CASE structure variants, and
   (3) an iteration or loop structure, including all WHILE . . . DO and REPEAT . . . UNTIL variants, j) when said region of step h) corresponds to the root of a process structure, and the viewer selects option (2), selecting one of:
   (1) replacing the contents of said region with a selected configuration of regions, and
   (2) placing the contents of said region within a distinguishable border at the top of said region and a selected configuration of regions immediately below, k) when said region of step j) corresponds to a clone element and the viewer has selected to modify the contents of said region, all regions corresponding to said clone element are similarly modified.

2. The method of claim 1 wherein the contents of a region of said step f), option (2) may be modified by editing the textual contents of the region as a result of manual effort by the viewer or by automatic manipulation of said textual contents.

3. The method of claim 1 wherein the appearance of a region of said step f), option (2) may be modified by selecting to change attributes, such as the color, of the display.

4. The method of claim 1 wherein the said regions of step f), option (4) may be modified by selecting one of:
   a) to insert regions corresponding to another tree-like structure where the region corresponding to the root of said tree-like structure is one of:
      (1) a replacement for said region, and
      (2) the sole region within said region,
   b) to modify the configuration of regions immediately within said region,
   c) to add a new region immediately within said region.

5. The method of claim 1 wherein the said region of step f), option (5) may be modified by selecting one of:
   a) to duplicate said region at a second region by replacing said second region,
   b) to move said region to a second region by replacing said second region, and deleting said region and regions contained within said region,
   c) to embed said region by selecting one of a: (1) sequence structure, (2) selection structure, and (3) iteration structure and displaying said region immediately within a new region corresponding to said selected structure wherein the new region corresponds to said selected structure and lies immediately within the region corresponding to the parent of said structure,
   d) to clone said region to a second region by connecting the element corresponding to said region to the element corresponding to said second region and drawing said region which replaces said second region, and elaborating the border of both said region and said second region,
   e) to insert a new region immediately after said region within the region which immediately contains said region.

6. The method of claim 1 wherein region borders may be efficiently displayed with minimal memory and processing power by combining small vertical and horizontal straight line segments.

7. The method of claim 1 wherein regions always appear in context within other regions and/or contain other regions and whereby all regions are drawn to the same scale.

* * * * *